US012228926B1

(12) United States Patent
Zhu et al.

(10) Patent No.: US 12,228,926 B1
(45) Date of Patent: *Feb. 18, 2025

(54) SYSTEM AND METHOD FOR PREDICTING BEHAVIORS OF DETECTED OBJECTS THROUGH ENVIRONMENT REPRESENTATION

(71) Applicant: Waymo LLC, Mountain View, CA (US)

(72) Inventors: Jiajun Zhu, Palo Alto, CA (US); David I. Ferguson, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/672,166

(22) Filed: Feb. 15, 2022

Related U.S. Application Data

(63) Continuation of application No. 16/737,318, filed on Jan. 8, 2020, now Pat. No. 11,287,820, which is a
(Continued)

(51) Int. Cl.
G05D 1/00 (2024.01)
B60W 30/095 (2012.01)
(Continued)

(52) U.S. Cl.
CPC ....... *G05D 1/0088* (2013.01); *B60W 30/0956* (2013.01); *G01S 13/862* (2013.01);
(Continued)

(58) Field of Classification Search
CPC .... G01S 17/931; G01S 13/865; G01S 13/867; G01S 13/931; G01S 2013/93272;
(Continued)

(56) References Cited

U.S. PATENT DOCUMENTS 4,970,653 A 11/1990 Kenue
5,163,002 A 11/1992 Kurami
(Continued)

FOREIGN PATENT DOCUMENTS

CN 102227612 A * 10/2011 .......... G01S 17/023
DE 19948252 A1 6/2001
(Continued)

OTHER PUBLICATIONS

S. K. Jayaraman, L. P. Robert, X. J. Yang, A. K. Pradhan and D. M. Tilbury, "Efficient Behavior-aware Control of Automated Vehicles at Crosswalks using Minimal Information Pedestrian Prediction Model," 2020 American Control Conference (ACC), 2020, pp. 4362-4368, doi: 10.23919/ACC45564.2020.9147248.*
(Continued)

*Primary Examiner* — Cuong H Nguyen
(74) *Attorney, Agent, or Firm* — Botos Churchill IP Law

(57) ABSTRACT

Aspects of the invention relate generally to autonomous vehicles. The features described improve the safety, use, driver experience, and performance of these vehicles by performing a behavior analysis on mobile objects in the vicinity of an autonomous vehicle. Specifically, the autonomous vehicle is capable of detecting nearby objects, such as vehicles and pedestrians, and is able to determine how the detected vehicles and pedestrians perceive their surroundings. The autonomous vehicle may then use this information to safely maneuver around all nearby objects.

23 Claims, 10 Drawing Sheets

Related U.S. Application Data continuation of application No. 15/670,128, filed on Aug. 7, 2017, now Pat. No. 10,564,639, which is a continuation of application No. 15/161,556, filed on May 23, 2016, now Pat. No. 9,766,626, which is a continuation of application No. 13/366,828, filed on Feb. 6, 2012, now Pat. No. 9,381,916.

(51) Int. Cl.

| | | |
|---|---|---|
| *G01S 13/86* | (2006.01) | |
| *G01S 13/931* | (2020.01) | |
| *G01S 17/931* | (2020.01) | |
| *G05D 1/02* | (2020.01) | |
| *G08G 1/16* | (2006.01) | |
| *G01S 15/931* | (2020.01) | |
| *G08G 1/0967* | (2006.01) | |

(52) U.S. Cl.
CPC .......... *G01S 13/865* (2013.01); *G01S 13/867* (2013.01); *G01S 13/931* (2013.01); *G01S 17/931* (2020.01); *G05D 1/0248* (2013.01); *G05D 1/0257* (2013.01); *G08G 1/166* (2013.01); *G01S 2013/932* (2020.01); *G01S 2013/9322* (2020.01); *G01S 2013/93271* (2020.01); *G01S 2013/93272* (2020.01); *G01S 2013/93273* (2020.01); *G01S 2013/93274* (2020.01); *G01S 15/931* (2013.01); *G08G 1/096791* (2013.01); *G08G 1/16* (2013.01)

(58) Field of Classification Search
CPC . G01S 2013/93274; G01S 2013/93271; G01S 15/931; G01S 2013/932; G01S 2013/9322; G01S 2013/93273; G05D 1/0248; G05D 1/0257; G05D 1/0088; G05D 2201/0212; G08G 1/16; G08G 1/166; G08G 1/096791; B60W 30/0956
USPC ..................... 701/26–27, 533, 301
See application file for complete search history.

(56) References Cited

U.S. PATENT DOCUMENTS

| | | | |
|---|---|---|---|
| 6,151,539 A | 11/2000 | Bergholz et al. | |
| 6,421,603 B1 | 7/2002 | Pratt et al. | |
| 6,631,384 B1 | 10/2003 | Richman et al. | |
| 6,691,003 B1 | 2/2004 | Stortz et al. | |
| 6,771,208 B2 | 8/2004 | Lutter et al. | |
| 6,952,001 B2 | 10/2005 | Mckendree et al. | |
| 7,145,441 B2 | 12/2006 | Knoop et al. | |
| 7,167,799 B1 | 1/2007 | Dolgov et al. | |
| 7,233,683 B2 | 6/2007 | Han et al. | |
| 7,233,861 B2 | 6/2007 | Van Buer et al. | |
| 7,275,431 B2 | 10/2007 | Zimmermann et al. | |
| 7,409,295 B2 | 8/2008 | Paradie | |
| 7,499,804 B2 | 3/2009 | Svendsen et al. | |
| 7,579,942 B2 | 8/2009 | Kalik | |
| 7,610,123 B2 | 10/2009 | Han et al. | |
| 7,617,048 B2 | 11/2009 | Simon et al. | |
| 7,634,383 B2 | 12/2009 | Engel et al. | |
| 7,864,032 B2 | 1/2011 | Kogure et al. | |
| 7,903,021 B2 | 3/2011 | Aso et al. | |
| 7,974,714 B2 | 7/2011 | Hoffberg | |
| 7,974,748 B2 | 7/2011 | Goerick et al. | |
| 7,991,550 B2 | 8/2011 | Zeng | |
| 8,126,642 B2 | 2/2012 | Trepagnier et al. | |
| 8,150,574 B2 | 4/2012 | Han et al. | |
| 8,150,583 B2 | 4/2012 | Danner et al. | |
| 8,160,811 B2 | 4/2012 | Prokhorov | |
| 8,229,663 B2 | 7/2012 | Zeng et al. | |
| 8,280,623 B2 | 10/2012 | Trepagnier et al. | |
| 8,352,111 B2 | 1/2013 | Mudalige | |
| 8,353,737 B2 | 1/2013 | Sofman et al. | |
| 8,384,534 B2 | 2/2013 | James et al. | |
| 8,417,490 B1 | 4/2013 | Preston et al. | |
| 8,538,674 B2 | 9/2013 | Breuer et al. | |
| 8,660,734 B2* | 2/2014 | Zhu .................. B60W 30/08 701/23 |
| 8,744,741 B2 | 6/2014 | Brimble et al. | |
| 8,903,588 B2 | 12/2014 | Schmudderich et al. | |
| 9,146,898 B2* | 9/2015 | Ihlenburg ............ B60W 50/14 |
| 9,381,916 B1* | 7/2016 | Zhu .................. B60W 30/0956 |
| 9,485,874 B2* | 11/2016 | Chen .................. H05K 3/4038 |
| 9,495,874 B1* | 11/2016 | Zhu .................. G08G 1/096741 |
| 9,766,626 B1* | 9/2017 | Zhu .................. G01S 13/931 |
| 10,564,639 B1* | 2/2020 | Zhu .................. G05D 1/0257 |
| 11,287,820 B1* | 3/2022 | Zhu .................. G01S 13/867 |
| 11,409,304 B1* | 8/2022 | Cai .................. B60R 1/002 |
| 11,433,902 B2* | 9/2022 | Murashkin ............ G06N 3/08 |
| 2004/0176936 A1 | 9/2004 | Ohtsu et al. | |
| 2004/0233097 A1 | 11/2004 | Mckendree et al. | |
| 2005/0015203 A1 | 1/2005 | Nishira | |
| 2005/0131597 A1* | 6/2005 | Raz .................. G09B 19/167 701/29.1 |
| 2005/0192736 A1 | 9/2005 | Sawada et al. | |
| 2005/0203697 A1 | 9/2005 | Dalgleish | |
| 2006/0025897 A1 | 2/2006 | Shostak et al. | |
| 2006/0100783 A1 | 5/2006 | Haberer et al. | |
| 2007/0010944 A1 | 1/2007 | Ferrebee et al. | |
| 2008/0065290 A1* | 3/2008 | Breed .................. G01L 17/00 701/31.4 |
| 2008/0084283 A1* | 4/2008 | Kalik .................. B60Q 9/00 701/301 |
| 2008/0097700 A1 | 4/2008 | Grimm | |
| 2008/0162027 A1 | 7/2008 | Murphy et al. | |
| 2008/0189039 A1 | 8/2008 | Sadekar et al. | |
| 2008/0266168 A1 | 10/2008 | Aso et al. | |
| 2009/0005959 A1* | 1/2009 | Bargman ............... G08G 1/166 701/117 |
| 2009/0033540 A1* | 2/2009 | Breed ................. G05D 1/0278 701/472 |
| 2009/0037055 A1 | 2/2009 | Danner et al. | |
| 2009/0037122 A1 | 2/2009 | Engel et al. | |
| 2009/0125174 A1 | 5/2009 | Delean | |
| 2009/0326713 A1 | 12/2009 | Moriya | |
| 2010/0094520 A1 | 4/2010 | Zagorski | |
| 2010/0097200 A1 | 4/2010 | Hilsebecher et al. | |
| 2010/0106356 A1 | 4/2010 | Trepagnier et al. | |
| 2010/0194593 A1 | 8/2010 | Mays | |
| 2010/0205132 A1* | 8/2010 | Taguchi ................. G08G 1/166 706/46 |
| 2010/0256835 A1* | 10/2010 | Mudalige .............. G08G 1/164 701/2 |
| 2010/0256852 A1* | 10/2010 | Mudalige .............. G08G 1/164 701/24 |
| 2010/0256882 A1* | 10/2010 | Dreier .................... F16H 61/16 701/62 |
| 2010/0292886 A1* | 11/2010 | Szczerba ............. G01S 13/723 701/31.4 |
| 2011/0098886 A1 | 4/2011 | Deng | |
| 2011/0102195 A1 | 5/2011 | Kushi et al. | |
| 2011/0172822 A1 | 7/2011 | Ziegler et al. | |
| 2011/0257949 A1 | 10/2011 | Vasudevan et al. | |
| 2011/0299730 A1 | 12/2011 | Elinas et al. | |
| 2012/0010772 A1 | 1/2012 | Pack et al. | |
| 2012/0083960 A1 | 4/2012 | Zhu et al. | |
| 2012/0143488 A1 | 6/2012 | Othmezouri et al. | |
| 2012/0143808 A1 | 6/2012 | Karins et al. | |
| 2012/0179635 A1 | 7/2012 | Vasudevan et al. | |
| 2012/0253582 A1 | 10/2012 | Chrysanthakopoulos et al. | |
| 2012/0265380 A1 | 10/2012 | Kuwata et al. | |
| 2012/0283907 A1* | 11/2012 | Lee .................. B60T 8/17557 701/32.9 |
| 2012/0310466 A1 | 12/2012 | Fairfield et al. | |
| 2012/0316725 A1 | 12/2012 | Trepagnier et al. | |
| 2012/0330542 A1 | 12/2012 | Hafner et al. | |
| 2013/0054106 A1 | 2/2013 | Schmudderich et al. | |
| 2013/0151058 A1* | 6/2013 | Zagorski ................ G05D 1/0289 701/1 |
| 2013/0197736 A1 | 8/2013 | Zhu et al. | |

(56) References Cited

U.S. PATENT DOCUMENTS

| | | |
|---|---|---|
| 2013/0238181 A1 | 9/2013 | James |
| 2014/0142799 A1 | 5/2014 | Ferguson et al. |
| 2014/0330479 A1* | 11/2014 | Dolgov ............... G01S 13/865 |
| | | 701/28 |
| 2015/0243172 A1 | 8/2015 | Eskilson |
| 2015/0344030 A1 | 12/2015 | Damerow et al. |
| 2016/0176397 A1 | 6/2016 | Prokhorov et al. |
| 2017/0334066 A1 | 11/2017 | Levine et al. |
| 2020/0090290 A1 | 3/2020 | Cheung |
| 2020/0238904 A1* | 7/2020 | Kim ..................... G01S 13/931 |
| 2020/0273268 A1* | 8/2020 | Bhattacharyya ........................... |
| | | G06Q 10/06315 |
| 2020/0320377 A1 | 10/2020 | Battaglia et al. |
| 2020/0372597 A1 | 11/2020 | Cheung |
| 2022/0017113 A1* | 1/2022 | Han ..................... G05D 1/247 |

FOREIGN PATENT DOCUMENTS

| | | | | |
|---|---|---|---|---|
| DE | 19948254 | A1 | | 11/2001 |
| EP | 1754621 | A1 | | 2/2007 |
| EP | 3689557 | A1 | | 8/2020 |
| EP | 3745158 | A1 | * 12/2020 | ............ B60W 40/04 |
| JP | 2002365708 | A | | 12/2002 |
| JP | 2003511288 | A | | 3/2003 |
| JP | 2004199287 | A | | 7/2004 |
| JP | 2006227811 | A | | 8/2006 |
| JP | 2006260217 | A | | 9/2006 |
| JP | 2008007062 | A | | 1/2008 |
| JP | 2008293099 | A | | 12/2008 |
| JP | 2009086788 | A | | 4/2009 |
| JP | 2009291540 | A | | 12/2009 |
| JP | 2010134656 | A | | 6/2010 |
| KR | 20110097391 | A | | 8/2011 |
| KR | 20200125731 | A | | 11/2020 |
| WO | 2009028558 | A1 | | 3/2009 |
| WO | 2009099382 | A1 | | 8/2009 |

OTHER PUBLICATIONS

M. Gulzar, Y. Muhammad and N. Muhammad, "A Survey on Motion Prediction of Pedestrians and Vehicles for Autonomous Driving," in IEEE Access, vol. 9, pp. 137957-137969, 2021, doi: 10.1109/ACCESS.2021.3118224.*

"An Unsupervised User Behavior Prediction Algorithm Based on Machine Learning and Neural Network For Smart Home" by Tiankai Liang et al.; from Digital Object Identifier 10.1109/ACCESS.2018.2868984 (Year: 2018).*

An NPL-formatted document of CN 102227612 A by Trepagnier et al. (Year: 2011).*

An NPL-formatted document of JP4254844B2 by Toyota Motor Corp (Year: 2009).*

Mozaffari, Sajjad, et al. "Deep learning-based vehicle behavior prediction for autonomous driving applications: A review." IEEE Transactions on Intelligent Transportation Systems 23.1 (2020): 33-47. (Year: 2020).*

Zaghari, Nayereh, et al. "Improving the learning of self-driving vehicles based on real driving behavior using deep neural network techniques." The Journal of Supercomputing 77 (2021): 3752-3794. (Year: 2021).*

Geng, X., Liang, H., Yu, B., Zhao, P., He, L., & Huang, R. (2017). A scenario-adaptive driving behavior prediction approach to urban autonomous driving. Applied Sciences, 7(4), 426. (Year: 2017).*

Guo, Junyao, Unmesh Kurup, and Mohak Shah. "Is it safe to drive? An overview of factors, metrics, and datasets for driveability assessment in autonomous driving." IEEE Transactions on Intelligent Transportation Systems 21.8 (2019): 3135-3151. (Year: 2019).*

"International Search Report and Written Opinion received for PCT Patent Application No. PCT/US2011/054157, mailed on Apr. 24, 2012", 9 pages.

"International Search Report and Written Opinion received for PCT Patent Application No. PCT/US2013/023399, mailed on May 13, 2013", 10 pages.

Artan, et al., "Comparison of Face Detection and Image Classification for Detecting Front Seat Passengers in Vehicles", IEEE Winter Conference on Applications of Computer Vision, Mar. 24-26, 2014, pp. 1006-1012.

Bautin, et al., "Inevitable Collision States: A Probabilistic Perspective", 2010 IEEE International Conference on Robotics and Automation (ICRA), Anchorage Convention District, May 3-8, 2010, pp. 4022-4027.

Bounini, et al., "Autonomous Vehicle and Real Time Road Lanes Detection and Tracking", 2015 IEEE Vehicle Power and Propulsion Conference (VPPC), Oct. 19-22, 2015, 6 pages.

Cardarelli, et al., "Cloud Robotics Paradigm for Enhanced Navigation of Autonomous Vehicles in Real World Industrial Applications", 2015 IEEE/RSJ International Conference on Intelligent Robots and Systems (IROS), Sep. 28-Oct. 2, 2015, pp. 4518-4523.

Foka, et al., "Predictive Autonomous Robot Navigation", Proceedings of the 2002 IEEE/RSJ, International Conference on Intelligent Robots and Systems, Oct. 2002, pp. 490-495.

Jia, et al., "Formation Control and Obstacle Avoidance Algorithm of Multiple Autonomous Underwater Vehicles(AUVs) Based on Potential Function and Behavior Rules", Proceedings of the IEEE, International Conference on Automation and Logistics, Aug. 18-21, 2007, pp. 569-573.

Kogler, et al., "Embedded Stereo Vision System for Intelligent Autonomous Vehicles", 2006 IEEE Intelligent Vehicles Symposium, Jun. 13-15, 2006, pp. 64-69.

Kwon, et al., "Collision Prediction At Intersection In Sensor Network Environment", 2006 IEEE Intelligent Transportation Systems Conference, Sep. 17-20, 2006, pp. 982-987.

Lages, Ulrich, "Collision Avoidance System For Fixed Obstacles-Fuzzy Controller Network For Robot Driving Of An Autonomous Vehicle", 2001 IEEE Intelligent Transportation Systems Conference Proceedings, Aug. 25-29, 2001, pp. 489-491.

Olofsson, B., et al., Using crash databases to predict effectiveness of new autonomous vehicle maneuvers for lane-departure injury reduction; B Olofsson, L Nielsen—IEEE Transactions on Intelligent . . . , ieeexplore.ieee.org; (year: 2020).

Overstreet, et al., "First-Order Short-Range Mover Prediction Model (SRMPM)", 2011 American Control Conference, Jun. 29-Jul. 1, 2011, pp. 5318-5323.

Overstreet, et al., "Multi-Ordered Short-Range Mover Prediction Models for Tracking and Avoidance", 51st IEEE Conference on Decision and Control, Dec. 10-13, 2012, pp. 1770-1775.

Perrelli, M., et al., On the Benefits of Using Object-Oriented Programming for the Objective Evaluation of Vehicle Dynamic Performance in Concurrent Simulations; M Perrelli, F Cosco, G Carbone, B Lenzo, D Mundo—Machines, 2021—mdpi.com.

Schon, et al., "Lane Departure Detection For Improved Road Geometry Estimation", Intelligent Vehicles Symposium, Jun. 13-15, 2006, pp. 546-551.

Shahrdar, S, New Structured Data Collection Approach for Real-Time Trust Measurement in Human-Autonomous Vehicle Interactions; S Shahrdar—search.proquest.com; (Year: 2018).

Tawari, et al., "Looking-in and Looking-out Vision for Urban Intelligent Assistance: Estimation of Driver Attentive State And Dynamic Surround for Safe Merging and Braking", 2014 IEEE Intelligent Vehicles Symposium Proceedings (IV), Jun. 8-11, 2014, pp. 115-120.

Weon, IS, et al., Object recognition based interpolation with 3D lidar and vision for autonomous driving of an intelligent vehicle; IS Weon, SG Lee, JK Ryu—IEEE Access, ieeexplore.ieee.org; (Year: 2020).

Worrall, et al., "A Probabilistic Method for Detecting Impending Vehicle Interactions", 2008 IEEE International Conference on Robotics and Automation, May 19-23, 2008, pp. 1787-1791.

Wu, et al., "Real-Time Multiple-Vehicle Detection and Tracking System in Complex Environment with Automatic Lane Detection and Reducing Shadow Effects", 2011 First International Conference on Robot, Vision and Signal Processing, Nov. 21-23, 2011, pp. 23-26.

(56) References Cited

OTHER PUBLICATIONS

Yuan, et al., "Control of Variable Pitch and Variable Speed Direct-Drive Wind Turbines in Weak Grid Systems with active Power Balance", IET Renewable Power Generation, vol. 8, No. 2, Mar. 2014, pp. 110-131.

* cited by examiner

FIGURE 1    100

SYSTEM AND METHOD FOR PREDICTING BEHAVIORS OF DETECTED OBJECTS THROUGH ENVIRONMENT REPRESENTATION

CROSS-REFERENCE TO RELATED APPLICATIONS

The present application is a continuation of U.S. patent application Ser. No. 16/737,318, filed Jan. 8, 2020, which is a continuation of U.S. patent application Ser. No. 15/670,128, filed Aug. 7, 2017, now issued as U.S. Pat. No. 10,564,639 on Feb. 18, 2020, which is a continuation of U.S. patent application Ser. No. 15/161,556, filed May 23, 2016, now issued as U.S. Pat. No. 9,766,626 on Sep. 19, 2017, which is a continuation of U.S. patent application Ser. No. 13/366,828, filed Feb. 6, 2012, now issued as U.S. Pat. No. 9,381,916 on Jul. 5, 2016, the disclosures of which are incorporated herein by reference.

BACKGROUND

Autonomous vehicles use various computing systems to aid in the transport passengers from one location to another. Some autonomous vehicles may require some initial input or continuous input from an operator, such as a pilot, driver, or passenger. Other systems, for example autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

BRIEF SUMMARY

In various aspects, the invention provides a vehicle having a steering device (e.g., wheels that turn in the case of an automobile and a rudder in the case of a boat) and engine. The steering device may be controlled by a first user input controller (e.g., a steering wheel in the cockpit of a car), the engine may be controlled by a second user input controller (e.g., accelerator in the case of a car or a throttle in the case of boat), and both the engine and device may be controlled by a processor capable of executing computer instructions. The vehicle includes one or more sensors (e.g., cameras, radar, laser range finders) for capturing information relating to the environment in which the vehicle is operating. The processor receives data from the sensors and, based in part on data from the sensors or received from external sources or both, issues a navigation command, where a navigation command comprises a command to the steering device relating to the intended direction of the vehicle (e.g., a command to turn the front wheels of a car 10 degrees to the left) or to the engine relating to the intended velocity of the vehicle (e.g., a command to accelerate). Navigation commands may also include commands to brakes to slow the vehicle down, as well as other commands affecting the movement of the vehicle.

In one aspect, sensors are used to detect a plurality of objects external to the vehicle, and data corresponding to the objects is sent to a processor. The processor analyzes the data corresponding to the objects to identify the object as mobile objects (e.g. automobiles, trucks, pedestrians, bicycles, etc.) or stationary objects (e.g., signposts, buildings, trees, etc.). The processor may then determine the position and movement of a first mobile object relative to one or more of the other detected objects. Based on how the first object perceives its surroundings, the processor may predict the likely behavior of the first object. The vehicle is then capable of orienting itself autonomously in an intended position and velocity based at least in part on the likely behavior of the objects.

In another aspect, the vehicle may orient itself so as to reduce the risk of potential collisions with the first object as the object travels in the predicted manner. For example, if a first detected object is traveling along a first lane of traffic, and the predicted likely behavior of the detected object includes the first object changing from the first lane of traffic to a second lane of traffic. The command to orient the vehicle may include having the vehicle travel in a lane of traffic other than the second lane of traffic.

In yet another aspect, the processor may select a second object from the plurality of objects and determine the position and movement of the plurality of objects relative to the second object. The processor may then predict the likely behavior of the second object based on the determined position and movement of the plurality of objects and based on the predicted likely behavior of the first object. The processor then provides a command to orient the vehicle relative to the second object based on the likely behavior of the second object.

In still another aspect, the processor adjusts the predicted likely behavior of the first object based on the predicted likely behavior of the second object and provides a command to orient the vehicle relative to the first object based on the adjusted likely behavior of the first object.

In yet another aspect, the processor receives a request to navigate between a first location and a second location. The processor then autonomously navigates the vehicle between the first location and a second location, while simultaneously determining the likely behavior of detected objects and providing a command to orient the vehicle relative to those detected objects.

DETAILED DESCRIPTION

Aspects of the disclosure relate generally to an autonomous driving system. In particular, a vehicle implementing the autonomous driving system is capable of detecting and reacting to surrounding objects. Some of the detected objects will be mobile, such as pedestrians, automobiles, and bicycles. As set forth below, the autonomous driving system is operable to identify surrounding objects and determine how those objects perceive their surroundings. In addition, based on the object's perceived surroundings, the autonomous driving system may predict the object's likely movements and behavior. In turn, the vehicle may react to nearby objects in a way that decreases the likelihood of an accident and increases the efficiency of travel.

Figure 1:
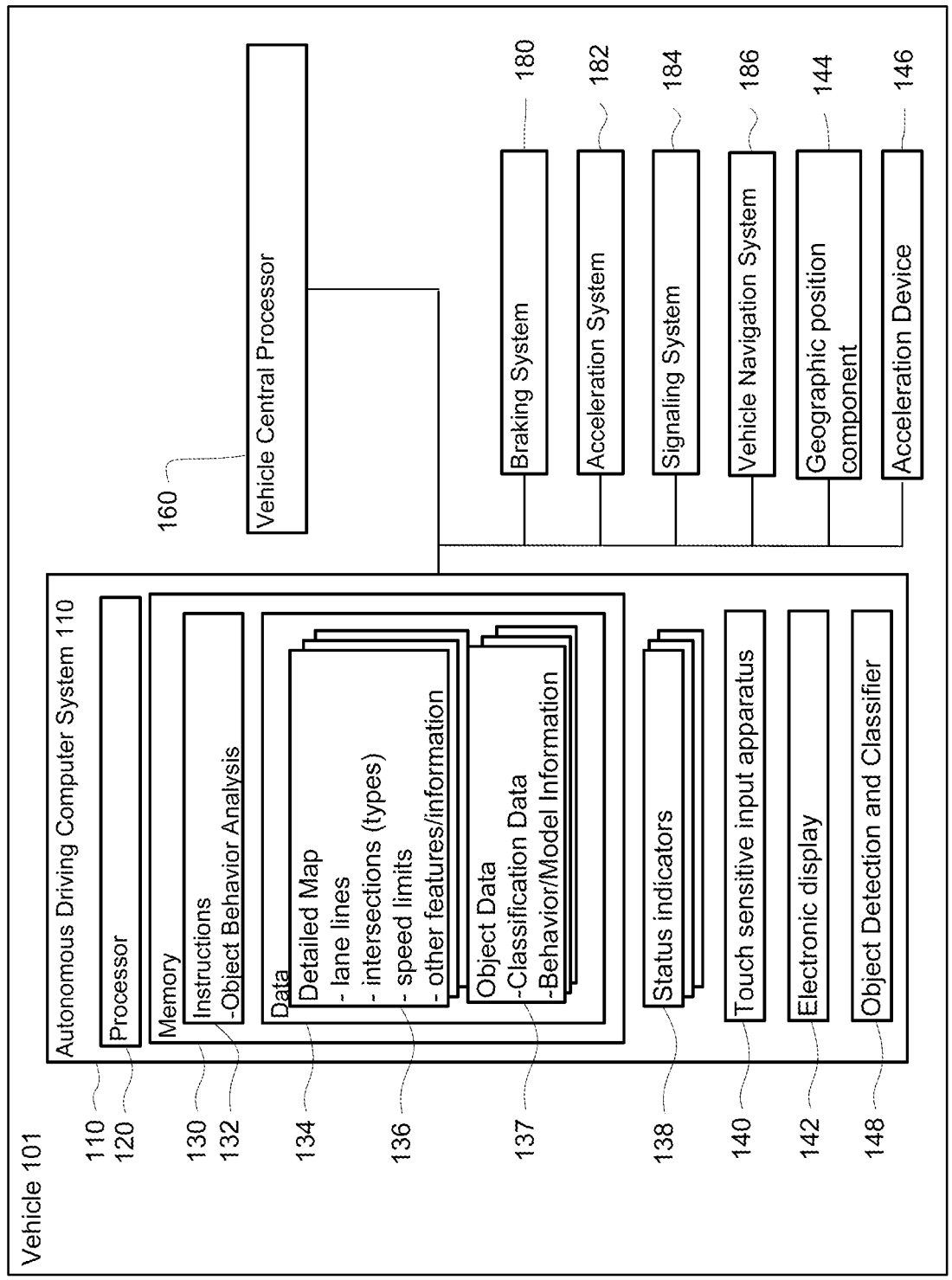
FIG. 1 is a functional diagram of an autonomous navigation system in accordance with an aspect of the disclosure.

As shown in FIG. 1, an autonomous driving system 100 in accordance with one aspect of the invention includes a vehicle 101 with various components. While certain aspects of the invention are particularly useful in connection with specific types of vehicles, the vehicle may be any type of vehicle including, but not limited to, cars, trucks, motorcycles, busses, boats, airplanes, helicopters, lawnmowers, recreational vehicles, amusement park vehicles, trams, golf carts, trains, and trolleys. The vehicle may have one or more computers, such as computer 110 containing a processor 120, memory 130 and other components typically present in general purpose computers.

The memory 130 stores information accessible by processor 120, including instructions 132 and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the system and method is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as processors from Intel Corporation or Advanced Micro Devices. Alternatively, the processor may be a dedicated device such as an ASIC. Although FIG. 1 functionally illustrates the processor, memory, and other elements of computer 110 as being within the same block, it will be understood by those of ordinary skill in the art that the processor and memory may actually comprise multiple processors and memories that may or may not be stored within the same physical housing. For example, memory may be a hard drive or other storage media located in a housing different from that of computer 110. Accordingly, references to a processor or computer will be understood to include references to a collection of processors or computers or memories that may or may not operate in parallel. Rather than using a single processor to perform the steps described herein some of the components such as steering components and deceleration components may each have their own processor that only performs calculations related to the component's specific function.

In various of the aspects described herein, the processor may be located remote from the vehicle and communicate with the vehicle wirelessly. In other aspects, some of the processes described herein are executed on a processor disposed within the vehicle and others by a remote processor, including taking the steps necessary to execute a single maneuver.

Computer 110 may include all of the components normally used in connection with a computer, such as a central processing unit (CPU), memory (e.g., RAM and internal hard drives) storing data 134 and instructions such as a web browser, an electronic display 142 (e.g., a monitor having a screen, a small LCD touch-screen or any other electrical device that is operable to display information), user input (e.g., a mouse, keyboard, touch screen and/or microphone), as well as various sensors (e.g. a video camera) for gathering the explicit (e.g. a gesture) or implicit (e.g. "the person is asleep") information about the states and desires of a person.

The vehicle may also include a geographic position component 144 in communication with computer 110 for determining the geographic location of the device. For example, the position component may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location.

The device may also include other features in communication with computer 110, such as an accelerometer, gyroscope or another direction/speed detection device 146 to determine the direction and speed of the vehicle or changes thereto. By way of example only, acceleration device 146 may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the user, computer 110, other computers and combinations of the foregoing.

The computer 110 may control the direction and speed of the vehicle by controlling various components. By way of example, if the vehicle is operating in a completely autonomous mode, computer 110 may cause the vehicle to accelerate (e.g., by increasing fuel or other energy provided to the engine), decelerate (e.g., by decreasing the fuel supplied to the engine or by applying brakes) and change direction (e.g., by turning the front two wheels).

Computer 110 may also control status indicators 138, in order to convey the status of the vehicle and its components to a passenger of vehicle 101. For example, vehicle 101 may be equipped with a display 225 for displaying information relating to the overall status of the vehicle, particular sensors, or computer 110 in particular. The display 225 may include computer generated images of the vehicle's surroundings including, for example, the status of the computer (cruise), the vehicle itself 410, roadways 420, intersections 430, as well as other objects and information.

Figure 2:
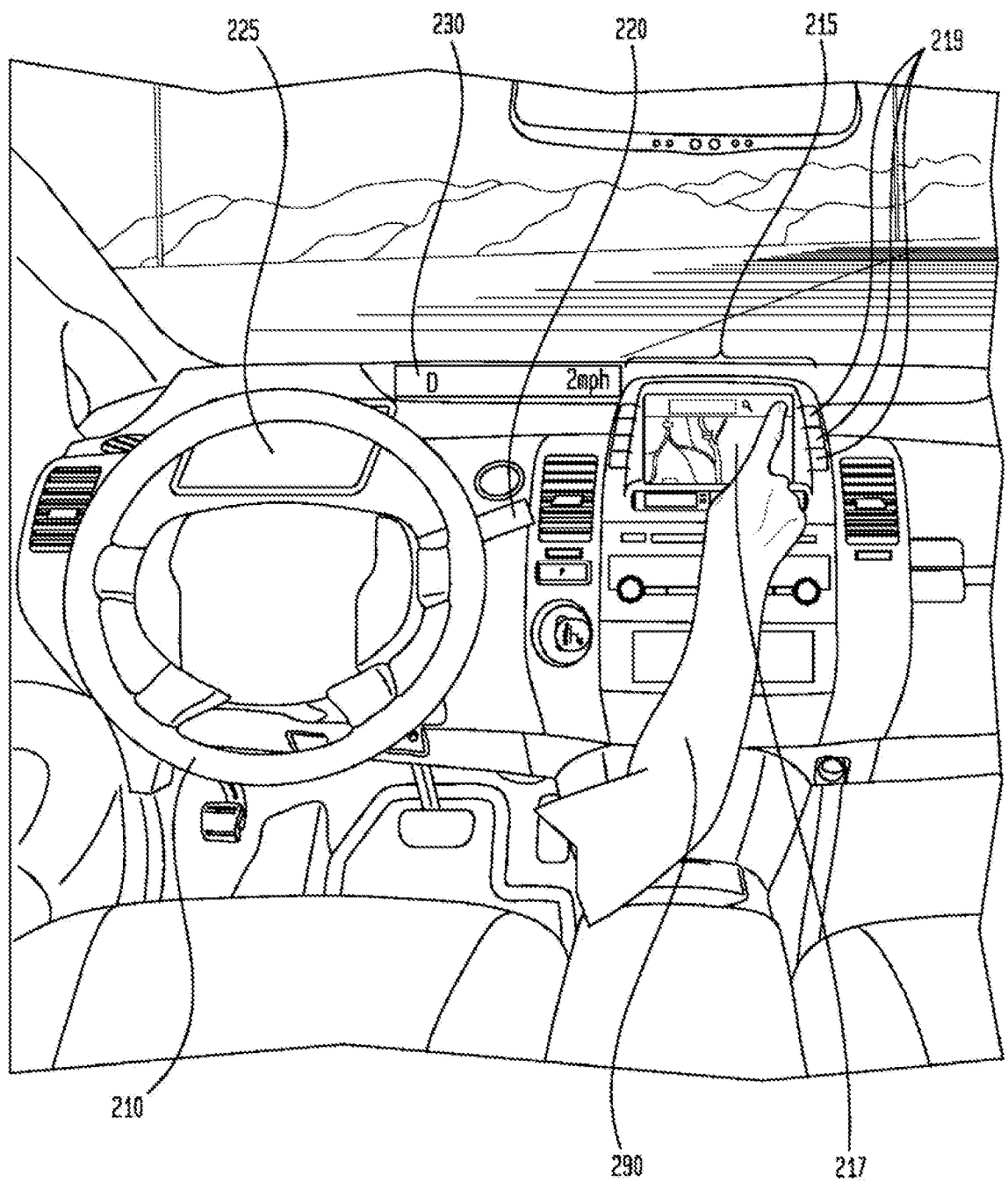
FIG. 2 is an exemplary design of the interior of an autonomous vehicle in accordance with an aspect of the disclosure.

Computer 110 may use visual or audible cues to indicate whether computer 110 is obtaining valid data from the various sensors, whether the computer is partially or completely controlling the direction or speed of the car or both, whether there are any errors, etc. Vehicle 101 may also include a status indicating apparatus, such as status bar 230, to indicate the current status of vehicle 101. In the example of FIG. 2, status bar 230 displays "D" and "2 mph" indicating that the vehicle is presently in drive mode and is moving at 2 miles per hour. In that regard, the vehicle may display text on an electronic display, illuminate portions of vehicle 101, or provide various other types of indications. In addition, the computer may also have external indicators which indicate whether, at the moment, a human or an automated system is in control of the vehicle, that are readable by humans, other computers, or both.

In one example, computer 110 may be an autonomous driving computing system capable of communicating with various components of the vehicle. For example, computer 110 may be in communication with the vehicle's conventional central processor 160 and may send and receive information from the various systems of vehicle 101, for example the braking 180, acceleration 182, signaling 184, and navigation 186 systems in order to control the movement, speed, etc. of vehicle 101. In addition, when engaged, computer 110 may control some or all of these functions of vehicle 101 and thus be fully or partially autonomous. It will be understood that although various systems and computer 110 are shown within vehicle 101, these elements may be external to vehicle 101 or physically separated by large distances.

FIG. 2 depicts an exemplary design of the interior of an autonomous vehicle. The autonomous vehicle may include all of the features of a non-autonomous vehicle, for example: a steering apparatus, such as steering wheel 210; a navigation display apparatus, such as navigation display 215; and a gear selector apparatus, such as gear shifter 220.

The vehicle may include components for detecting objects external to the vehicle such as other vehicles, obstacles in the roadway, traffic signals, signs, trees, etc. The detection system may include lasers, sonar, radar, cameras or any other detection devices. For example, if the vehicle is a small passenger car, the car may include a laser mounted on the roof or other convenient location. In one aspect, the laser may measure the distance between the vehicle and the object surfaces facing the vehicle by spinning on its axis and changing its pitch. The vehicle may also include various radar detection units, such as those used for adaptive cruise control systems. The radar detection units may be located on the front and back of the car as well as on either side of the front bumper. In another example, a variety of cameras may be mounted on the car at distances from one another which are known so that the parallax from the different images may be used to compute the distance to various objects which are captured by 2 or more cameras. These sensors allow the vehicle to understand and potentially respond to its environment in order to maximize safety for passengers as well as objects or people in the environment.

Many of these sensors provide data that is processed by the computer in real-time, that is, the sensors may continuously update their output to reflect the environment being sensed at or over a range of time, and continuously or as-demanded provide that updated output to the computer so that the computer can determine whether the vehicle's then-current direction or speed should be modified in response to the sensed environment.

Figure 3:
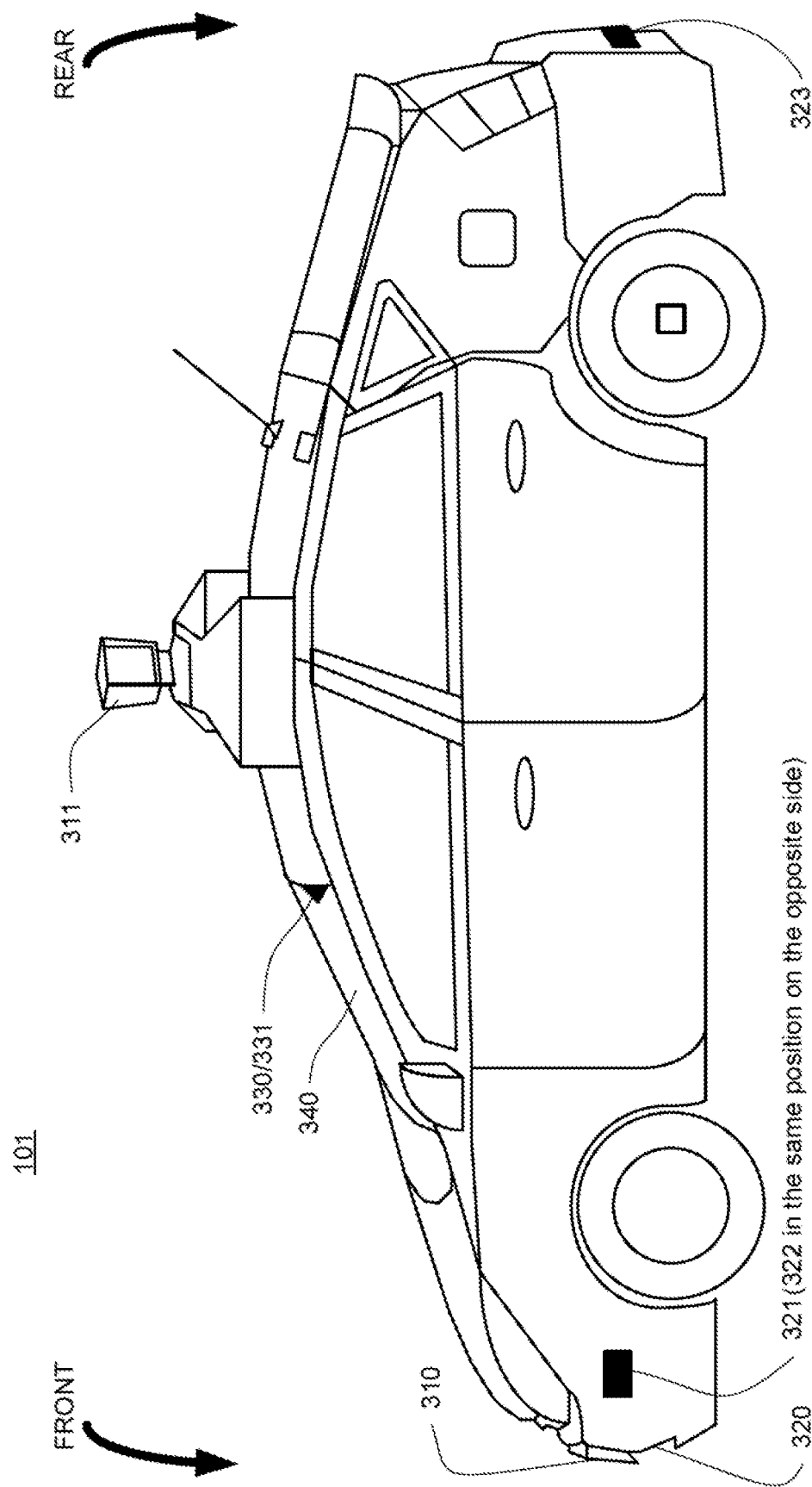
FIG. 3 is a view of the exterior of an exemplary vehicle in accordance with an aspect of the disclosure.

FIG. 3 illustrates a particular embodiment for a small passenger vehicle 301 that includes lasers 310 and 311, mounted on the front and top of the vehicle, respectively. Laser 310 may have a range of approximately 150 meters, a thirty degree vertical field of view, and approximately a thirty degree horizontal field of view. Laser 311 may have a range of approximately 50-80 meters, a thirty degree vertical field of view, and a 360 degree horizontal field of view. The lasers may provide the vehicle with range and intensity information which the computer may use to identify the location and distance of various objects. In one aspect, the lasers may measure the distance between the vehicle and the object surfaces facing the vehicle by spinning on its axis and changing its pitch.

The vehicle may also include various radar detection units, such as those used for adaptive cruise control systems. The radar detection units may be located on the front and back of the car as well as on either side of the front bumper. As shown in the example of FIG. 3, vehicle 301 includes radar detection units 320-323 located on the side (only one side being shown), front and rear of the vehicle. Each of these radar detection units may have a range of approximately 200 meters for an approximately 18 degree field of view as well as a range of approximately 60 meters for an approximately 56 degree field of view.

In another example, a variety of cameras may be mounted on the vehicle. The cameras may be mounted at predetermined distances so that the parallax from the images of 2 or more cameras may be used to compute the distance to various objects. As shown in FIG. 3, vehicle 301 may include 2 cameras 330-331 mounted under a windshield 340 near the rear view mirror (not shown). Camera 330 may include a range of approximately 200 meters and an approximately 30 degree horizontal field of view, while camera 331 may include a range of approximately 100 meters and an approximately 60 degree horizontal field of view.

Figure 4A:
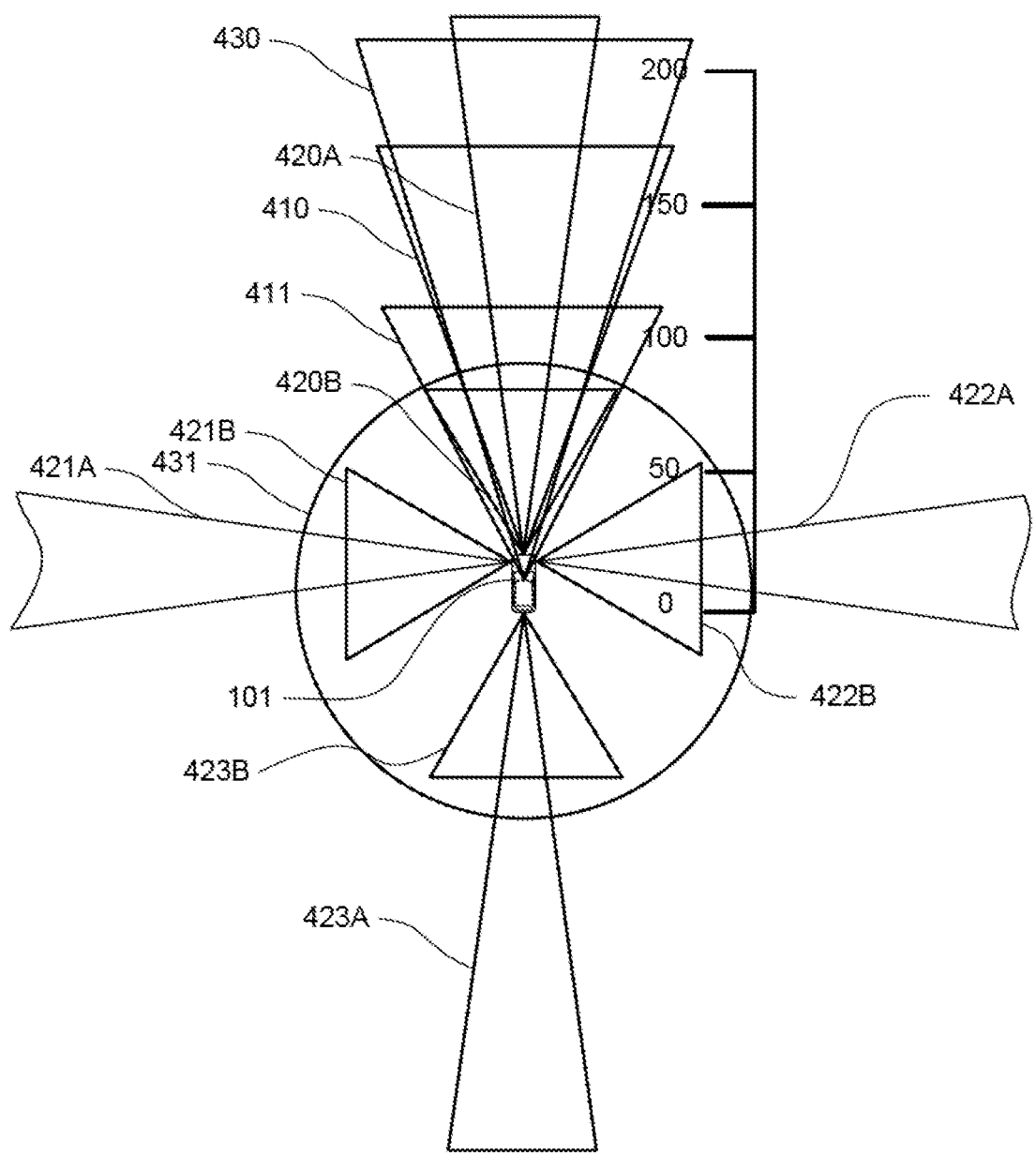
FIGS. 4A-4D are views of the sensor fields for an autonomous vehicle.

Each sensor may be associated with a particular sensor field in which the sensor may be used to detect objects. FIG. 4A is a top-down view of the approximate sensor fields of the various sensors. FIG. 4B depicts the approximate sensor fields 410 and 411 for lasers 310 and 311, respectively based on the fields of view for these sensors. For example, sensor field 410 includes an approximately 30 degree horizontal field of view for approximately 150 meters, and sensor field 411 includes a 360 degree horizontal field of view for approximately 80 meters.

Figure 4C:
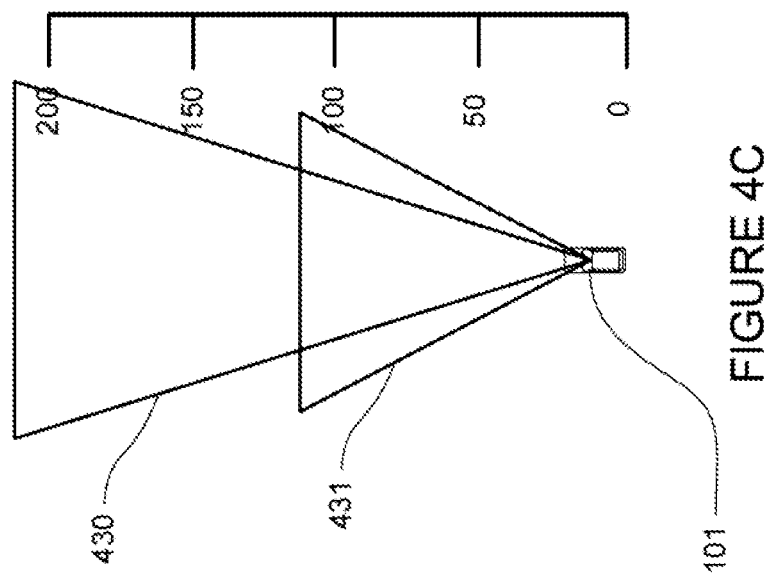
Figure 4B:
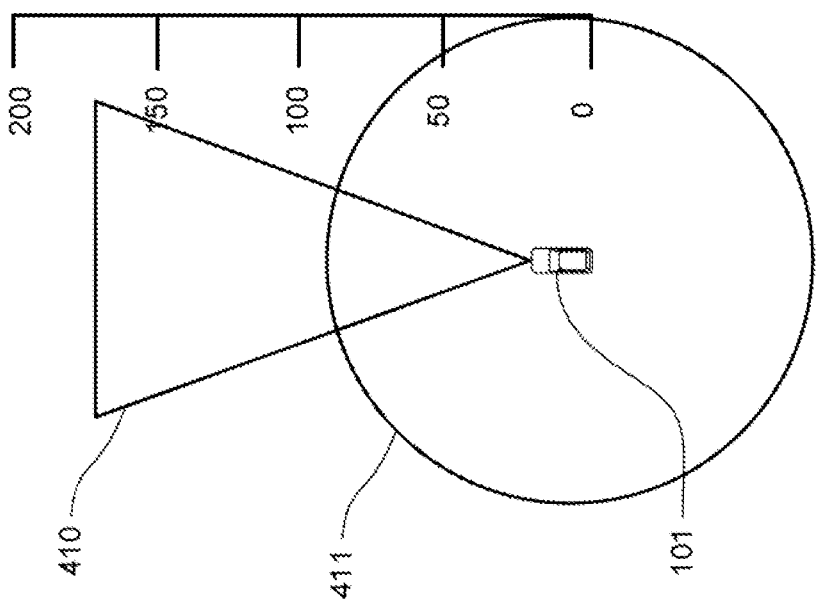
Figure 4D:
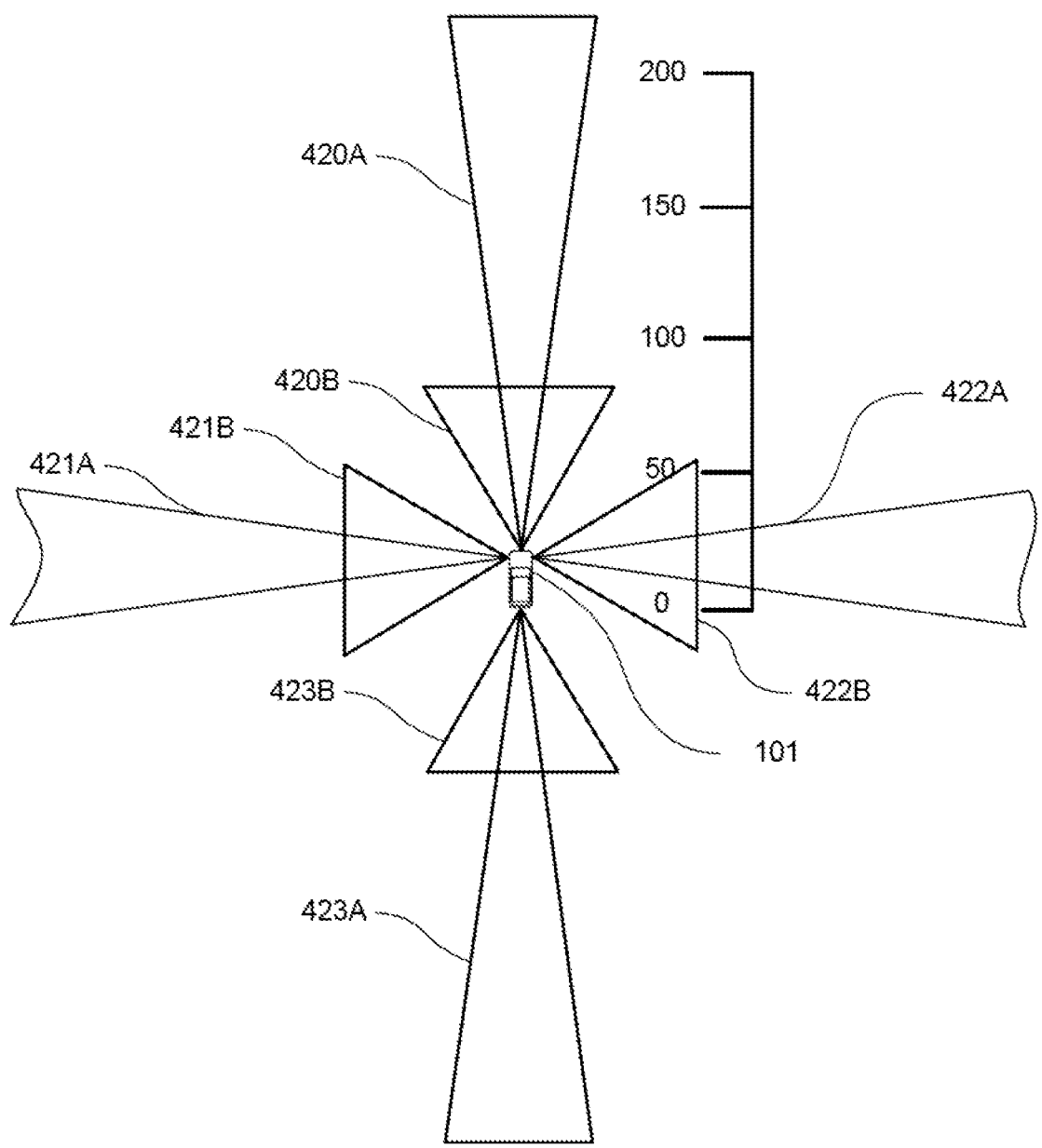

FIG. 4D depicts the approximate sensor fields 420A-423B and for radar detection units 320-323, respectively, based on the fields of view for these sensors. For example, radar detection unit 320 includes sensor fields 420A and 420B. Sensor field 420A includes an approximately 18 degree horizontal field of view for approximately 200 meters, and sensor field 420B includes an approximately 56 degree horizontal field of view for approximately 80 meters. Similarly, radar detection units 321-323 include sensor fields 421A-423A and 421B-423B. Sensor fields 421A-423A include an approximately 18 degree horizontal field of view for approximately 200 meters, and sensor fields 421B-423B include an approximately 56 degree horizontal field of view for approximately 80 meters. Sensor fields 421A and 422A extend passed the edge of FIGS. 4A and 4D.

FIG. 4C depicts the approximate sensor fields 430-431 cameras 330-331, respectively, based on the fields of view for these sensors. For example, sensor field 430 of camera 330 includes a field of view of approximately 30 degrees for approximately 200 meters, and sensor field 431 of camera 430 includes a field of view of approximately 60 degrees for approximately 100 meters.

In another example, an autonomous vehicle may include sonar devices, stereo cameras, a localization camera, a laser, and a radar detection unit each with different fields of view. The sonar may have a horizontal field of view of approximately 60 degrees for a maximum distance of approximately 6 meters. The stereo cameras may have an overlapping region with a horizontal field of view of approximately 50 degrees, a vertical field of view of approximately 10 degrees, and a maximum distance of approximately 30 meters. The localization camera may have a horizontal field of view of approximately 75 degrees, a vertical field of view of approximately 90 degrees and a maximum distance of approximately 10 meters. The laser may have a horizontal field of view of approximately 360 degrees, a vertical field of view of approximately 30 degrees, and a maximum distance of 100 meters. The radar may have a horizontal field of view of 60 degrees for the near beam, 30 degrees for the far beam, and a maximum distance of 200 meters.

The sensors described may be used to identify, track and predict the movements of pedestrians, bicycles, other vehicles, or objects in the roadway. For example, the sensors may provide the location and shape information of objects surrounding the vehicle to computer 110, which in turn may identify the object as another vehicle. The object's current movement may be also be determined by the sensor (e.g., the component is a self-contained speed radar detector) or by the computer 110 based on information provided by the sensors (e.g., by comparing changes in the object's position data over time).

The computer may change the vehicle's current path and speed based on the presence of detected objects. For example, the vehicle may automatically slow down if its current speed is 50 mph and it detects, by using its cameras and using optical-character recognition, that it will shortly pass a sign indicating that the speed limit is 35 mph. Yet further, if the computer determines that an object is obstructing the intended path of the vehicle, it may maneuver the vehicle around the obstruction.

Yet further, the vehicle's computer system may predict a detected object's expected movement. For example, autonomous driving system 100 is operable to predict a another vehicle's future movement based solely on the other vehicle's instant direction, acceleration/deceleration and velocity, e.g., that the other vehicle's current direction and movement will continue. However, system 100 may also predict a detected vehicle's future movement by analyzing data relating to the other vehicle's current surroundings and determining how the other vehicle will likely respond to those surroundings. In other words, Autonomous driving system 100 uses an object-centric, view of it's environment, in that the system determines what the other vehicles are perceiving in order to better predict how those vehicles will behave.

Once an object is detected, system 100 may determine the type of the object, for example, a traffic cone, person, car, truck or bicycle, and use this information to predict the object's future behavior. Objects may be identified by using an object classifier 148 which may consider various characteristics of the detected objects, such as the size of an object, the speed of the object (bicycles do not tend to go faster than 40 miles per hour or slower than 0.1 miles per hour), the heat coming from the bicycle (bicycles tend to have rider that emit heat from their bodies), etc. In addition, the object may be classified based on specific attributes of the object, such as information contained on a license plate, bumper sticker, or logos that appear on the vehicle. In another example, the scene external to the vehicle need not be segmented from input of the various sensors and nor do objects need to be classified for the vehicle to take a responsive action. Rather the vehicle may take one or more actions based on the color and/or shape of an object.

The system may also rely on information that is independent of other detected object's in order to predict the an object's next action. By way of example, if the vehicle determines that another object is a bicycle that is beginning to ascend a steep hill in front of the vehicle, the computer may predict that the bicycle will soon slow down—and will slow the vehicle down accordingly-regardless of whether the bicycle is currently traveling at a somewhat high speed.

It will be understood that the forgoing methods of identifying, classifying, and reacting to objects external to the vehicle may be used alone or in any combination in order to increase the likelihood of avoiding a collision.

By way of further example, the system may determine that an object near the vehicle is another car in a turn-only lane (e.g., by analyzing image data that captures the other car, the lane the other car is in, and a painted left-turn arrow in the lane). In that regard, the system may predict that the other car may turn at the next intersection.

The computer may cause the vehicle to take particular actions in response to the predicted actions of the surrounding objects. For example, if the computer 110 determines that the other car is turning at the next intersection as noted above, the computer may slow the vehicle down as it approaches the intersection. In this regard, the predicted behavior of other objects is based not only on the type of object and its current trajectory, but also based on some likelihood that the object may obey traffic rules or predetermined behaviors. In another example, the system may include a library of rules about what objects will do in various situations. For example, a car in a left-most lane that has a left-turn arrow mounted on the light will very likely turn left when the arrow turns green. The library may be built manually, or by the vehicle's observation of other vehicles (autonomous or not) on the roadway. The library may begin as a human built set of rules which may be improved by the vehicle's observations. Similarly, the library may begin as rules learned from vehicle observation and have humans examine the rules and improve them manually. This observation and learning may be accomplished by, for example, tools and techniques of machine learning. The rules library may be included in computer 110 or may alternatively be accessible to the vehicle 101 via a remote server, such as server 710 of FIG. 7.

In addition to processing data provided by the various sensors, the computer may rely on environmental data that was obtained at a previous point in time and is expected to persist regardless of the vehicle's presence in the environment. For example, data 134 may include detailed map information 136, e.g., highly detailed maps identifying the shape and elevation of roadways, lane lines, intersections, crosswalks, speed limits, traffic signals, buildings, signs, real time traffic information, or other such objects and information. For example, the map information may include explicit speed limit information associated with various roadway segments. The speed limit data may be entered manually or scanned from previously taken images of a speed limit sign using, for example, optical-character recognition. The map information may include three-dimensional terrain maps incorporating one or more of objects listed above. For example, the vehicle may determine that another car is expected to turn based on real-time data (e.g., using its sensors to determine the current GPS position of another car) and other data (e.g., comparing the GPS position with previously-stored lane-specific map data to determine whether the other car is within a turn lane).

The computer 110 may also access data 134 relating to certain types of objects that the vehicle 101 may encounter. As described above, the sensors of vehicle 101 may be used to identify, track and predict the movements of pedestrians, bicycles, vehicles, or other objects in or around the roadway. These objects may have particular behavior patterns that depend on the nature of the object. For example, a bicycle is likely to react differently than a tractor-trailer in a number of ways. Specifically, a bicycle is more likely to make erratic movements when compared with a tractor-trailer. Accordingly, in predicting an objects behavior, computer 110 may access object data 137 that contains numerous object classifications, such as pedestrians, bicycles, cars, tractor-trailers, etc. For each classification, the object data 137 may also contain behavior information that indicates how an object having a particular classification is likely to behave in a given situation. Vehicle 101 may then autonomously respond to the object based, in part, on the predicted behavior.

In addition to classifying the object, vehicle 101 may track a current state of the object. The object's state may include information used to determine the object's classification, but any type of environmental or contextual information may be used to determine the object's current state, such as the object's speed, route the object has traveled, nature of the roadway on which the object is traveling, any lane changes made by the object, or the object's use of headlights or blinkers.

Figure 5:
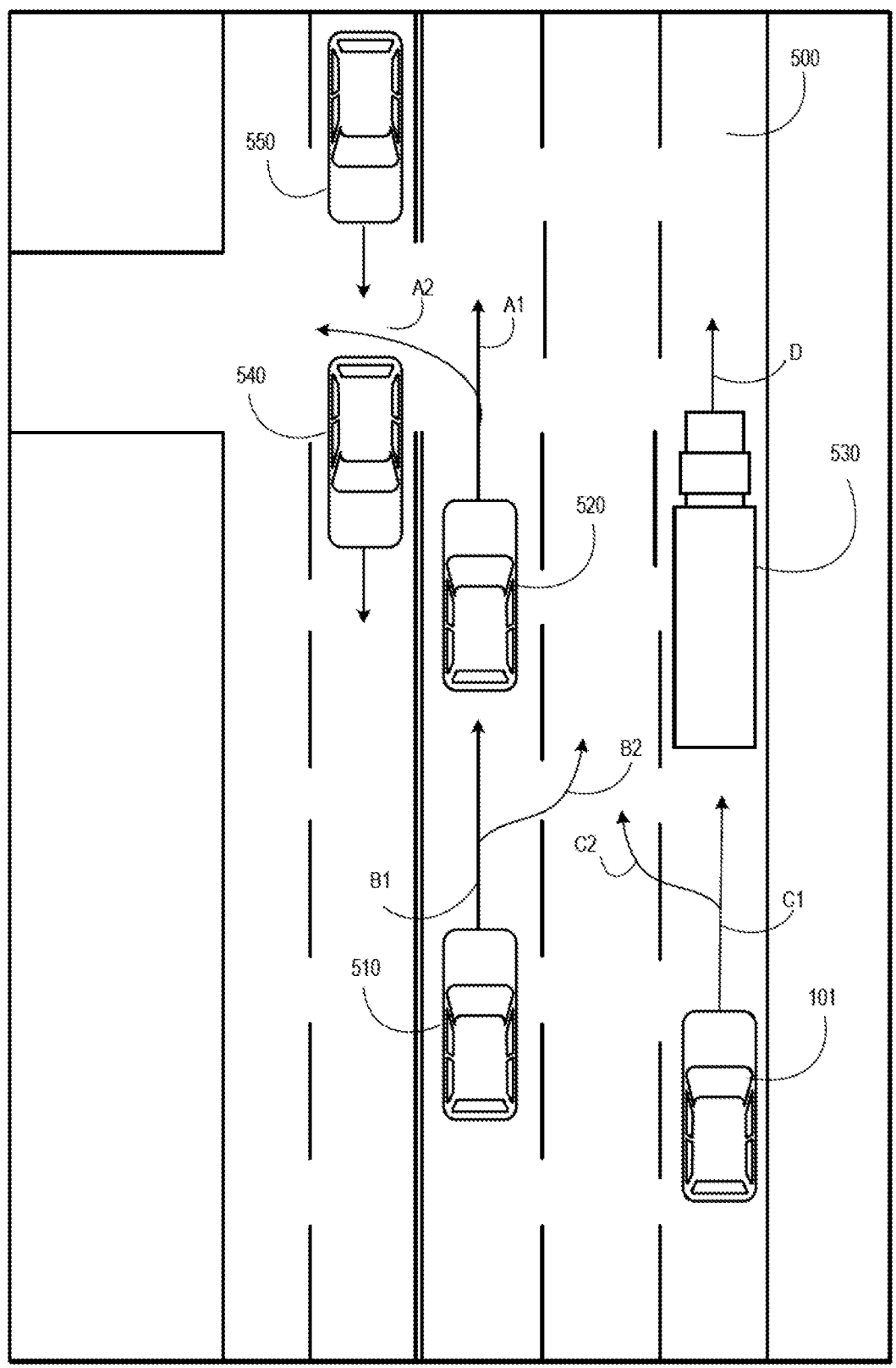
FIG. 5 is a view of an autonomous vehicle traveling autonomously in proximity to other vehicles.

FIG. 5 illustrates an example of autonomous vehicle 101 traveling on road 500. Using the sensors described above, autonomous vehicle 101 is capable of detecting surrounding vehicles, including vehicles 510, 520, 530, 540, and 550. As indicated by directional arrows A1, B1, C1, and D, vehicle 510 and vehicle 520 are currently traveling north along the left-hand lane, while autonomous vehicle 101 and vehicle 530 are traveling north in the right-hand lane. In this example, autonomous vehicle 101 detects that tractor trailer 530 is traveling very slowly, and seeks to pass it. Without using an object-centric behavior analysis, autonomous vehicle 101 may detect that none of the surrounding vehicles are currently traveling in the center, north-bound lane of road 500. Accordingly, autonomous vehicle 101 would determine that it may safely change from the right-hand lane of road 500 to the center lane, as indicated by arrow C2.

As stated above, system 100 may predict how the surrounding vehicles will behave based on how those vehicles, or the vehicles' operators, perceive their surroundings. For example, autonomous vehicle 101 is capable of predicting the likely actions of vehicle 510 by figuratively placing itself in the position of vehicle 510, and then determining how it would react given vehicle 510's current surroundings. By using an object-centric view from the perspective of vehicle 510, autonomous vehicle 101 is better able to predict the actions of vehicle 510, and in turn, better able to avoid potential accidents.

In the case of vehicle 510, nearby objects include vehicles 510, 520, 530, 540, and 550, as well as autonomous vehicle 101. Accordingly, autonomous vehicle 101 uses the sensors described above to collect position and movement data for each of these nearby objects relative to vehicle 510. For example, autonomous vehicle 101 may detect that vehicle 520 has turned on it's left-hand blinker or is slowing down as it approaches the next intersection. Autonomous vehicle 101 may, in turn, predict that vehicle 520 intends to make a left-hand turn, as indicated by directional arrow A2. Based on this additional data regarding vehicle 520, and by accessing the behavior model database 137 shown in FIG. 1, autonomous vehicle 101 is capable of altering it's prediction of vehicle 510's future movement. In particular, autonomous vehicle 101 determines how it would react if placed in vehicle 510's position behind the turning vehicle 520. Given that none of the other nearby vehicles occupy the center-lane in vehicle 510's direction of travel, the behavior model database 137 may predict that the operator of vehicle 510 will likely attempt change into the center lane, as indicated by directional arrow B2, in order to avoid being impeded by vehicle 520. Based on vehicle 510's predicted lane change, autonomous vehicle 101 may then determine that it is safer to continue along path C1, instead of changing lanes in accordance with path C2, in that a lane change could create a potential collision with vehicle 510.

Autonomous vehicle 101 may perform a similar, object-centric behavior prediction for each of the other nearby vehicles. For example, autonomous vehicle 101 may figuratively place itself in the position of vehicle 520, and determine that given the presence of vehicles 540 and 550, vehicle 520 will need to come to a complete stop before making the left-hand turn along path A2. In turn, autonomous vehicle 101 will increase the probability of vehicle 510 changing lanes along path B2, as it will be directly behind a stopped vehicle. In this way, autonomous vehicle 101 is able to determine how each nearby vehicle perceives it's surroundings and to adjust the predicted behavior of each vehicle based on the predicted behavior of other nearby vehicles.

Autonomous driving system 100 may use object-centric behavior models for numerous types, or classifications, of objects, including automobiles, bicycles, or pedestrians. In many instances, it is not practical to predict an object's behavior by determining how autonomous vehicle 101 would react if placed in the same situation. For example, a pedestrian or cyclist will not react to it's surroundings in the same way as autonomous vehicle 101. In addition, an autonomously navigated vehicle may not react the same was as a vehicle controlled by a driver. Accordingly, database 137 may include different object-centric behavior models for different classifications of objects, including autonomous or non-autonomous vehicles.

Figure 6:
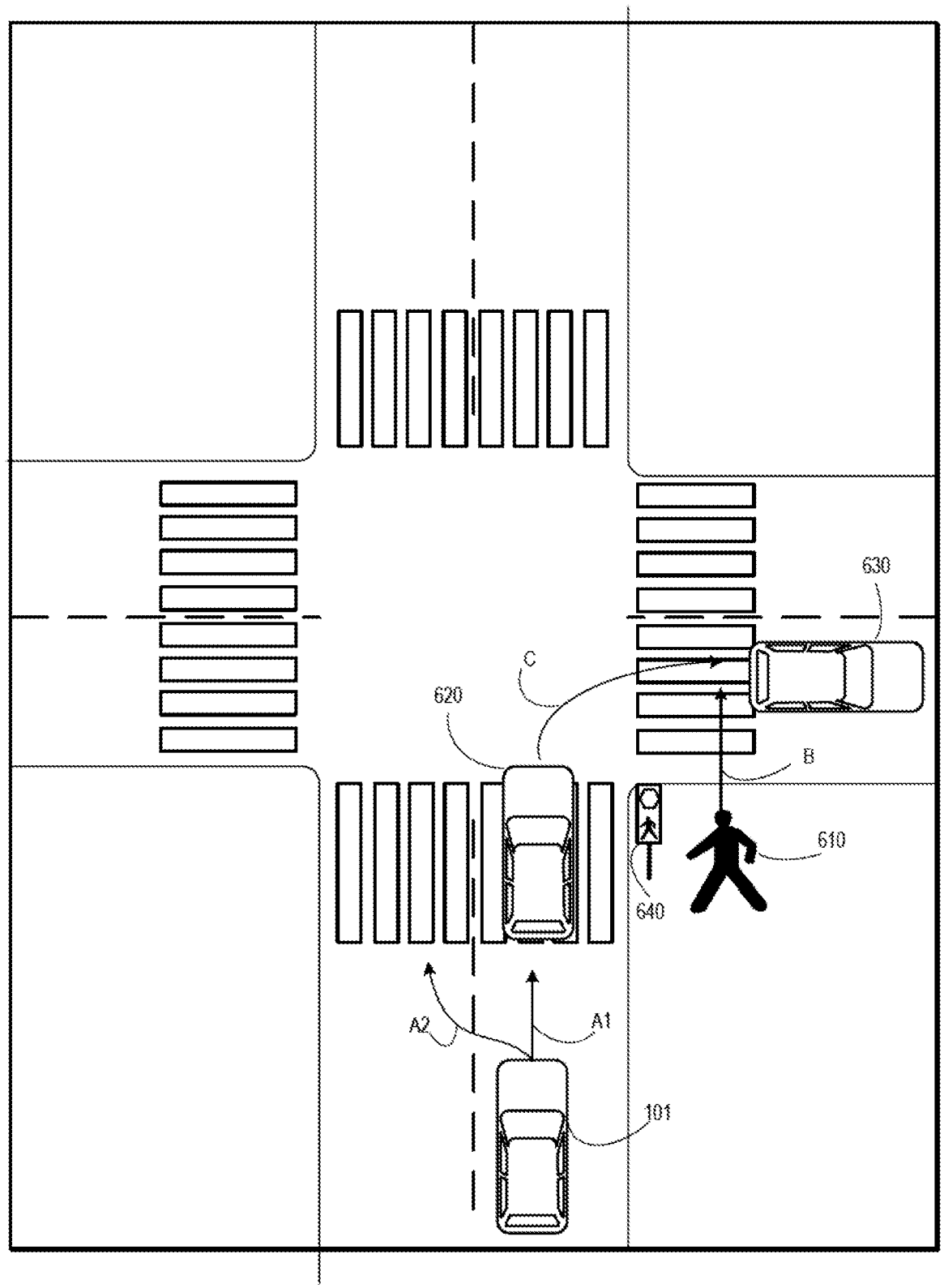
FIG. 6 is a view of an autonomous vehicle traveling autonomously in proximity to other vehicles and pedestrians.

In FIG. 6, autonomous vehicle 101 is traveling along path A1. Using the sensors described above, autonomous vehicle 101 detects a group of pedestrians 610, vehicle 620, vehicle 630, and pedestrian signal 640. Based on vehicle 620 activating it's right-hand blinker, autonomous vehicle 101 determines that vehicle 620 intends to turn right, as indicated by arrow C. Based on pedestrian signal 640, as well as the relative position of pedestrians 610, autonomous vehicle 101 predicts that pedestrians 610 are waiting to cross the street along path B. In accordance with one embodiment, autonomous vehicle 101 may access database 137 shown in FIG.

1, in order to determine whether pedestrians 610 will cross the street before or after vehicle 620 has completed it's right-hand turn. Specifically, autonomous vehicle 101 uses it's sensors to gather data for all objects in the vicinity of pedestrians 610, including position and movement data for vehicles 620 and 630, as well as the current signal being provided by pedestrian signal 640. Autonomous vehicle then accesses database 137 to determine whether pedestrians, in that situation, are likely to cross the street before vehicle 620 completes it's right-hand turn. Autonomous vehicle 101 therefore implements an object-centric view by determining how pedestrians 610 perceive their surroundings, and determining how they will react to those surroundings. Based on the object-centric predictions autonomous vehicle 101 will choose between path A1 and A2. Specifically, autonomous vehicle 101 will continue on path A1 if it is determined that pedestrians 610 will cross the street after vehicle 620 has completed it's right-hand turn. Alternatively, vehicle 101 will take path A2, if it is determined that pedestrians 610 will cross the street before vehicle 620 travels along path C. In this way, autonomous vehicle 101 will not be impeded by vehicle 620 as it waits for pedestrians 610 to cross in front of it.

The collection of data for vehicle or pedestrian movements may be accomplished in any number of ways. For example, the movement of vehicles may be tracked using satellite imagery, roadside cameras, on board GPS data, or via sensor data acquired from vehicles similar to vehicle 101. Preferably, the behavior model will be based on a large number of tracked objects for each classification of object. In this way, an accurate behavior model can be created for each classification of objects.

Figure 7:
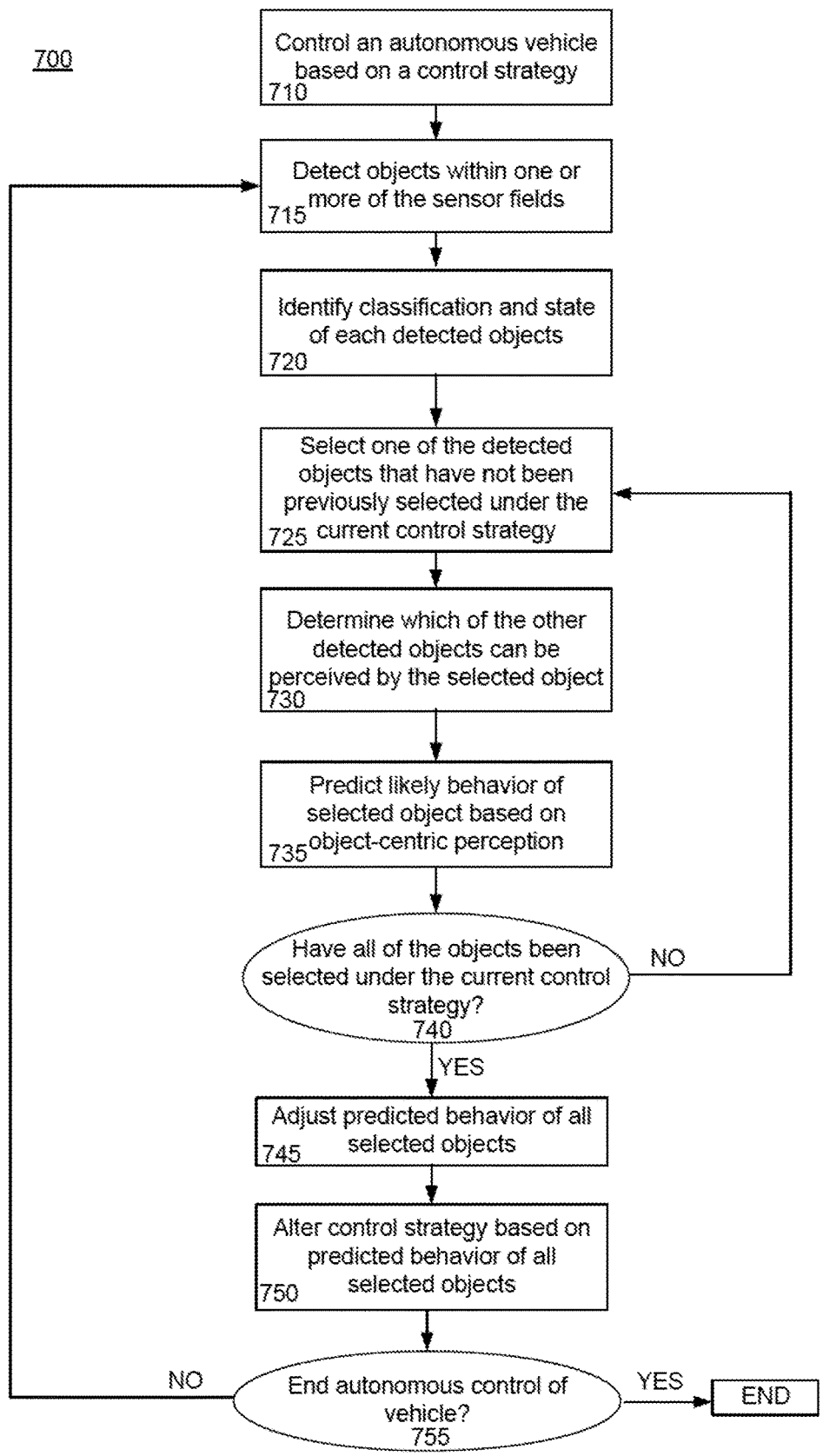
FIG. 7 is a flow chart in accordance with an aspect of the disclosure.

Autonomous vehicle 101 may transport itself, passengers, and/or cargo between two locations by following a route. For example, a driver may input a destination and activate an autonomous mode of the vehicle. In response, the vehicle's computer 110 may calculate a route using a map, its current location, and the destination. Based on the route (or as part of the route generation), the vehicle may determine a control strategy for controlling the vehicle along the route to the destination. For example, the control strategy may include where to turn, at what speeds to travel, what lane to travel in, where to look for traffic signals, where to stop for intersections or stop signs, etc. Flow diagram 700 of FIG. 7 provides an example by which vehicle 101 may be autonomously controlled in response to the object-centric prediction model. As provided in Block 710, vehicle 101 implements the determined control strategy by traveling to travel along the route. While traveling in accordance with the control strategy, vehicle 101 detects the presence of numerous objects within one or more of the vehicle's sensor fields (Block 715).

Upon detecting the objects, the vehicle's computer 110 may classify the object based on the data received by the vehicle's sensors (Block 720). For example, the sensor data could be used to classify objects as being a pedestrian, bicycle, sports car, pick-up truck, etc. As described above, the vehicle's computer 110 also uses the sensor data to determine the object's current state, such as speed, acceleration, and lane position. Upon determining the objects classification and current state, vehicle computer 110 may select one of the detected objects for analysis (Block 725). Computer 110 then determines which of the other detected objects can be perceived by the selected object (Block 730). For example, if the selected object is a vehicle with a driver, computer 110 may determine which of the other objects are within the line of sight of the driver. Computer 110 then predicts the likely behavior of the selected object based on the current state of the other perceived objects (Block 735). This prediction may be made by determining how the autonomous vehicle would react if placed in the position of the selected object. If the selected object is of a type that is substantially different than the autonomous vehicle, then computer 110 may predict the likely behavior of the selected object by accessing behavior model data. For example, if the selected object is a bicyclist, computer 110 may access database 137 to determine how a bicyclist would likely react in light of the surrounding objects. Computer 110 then determines whether all of the detected objects have been selected under the current control strategy (Block 740). If the answer is no, then computer 110 returns to Block 725, wherein it selects another detected object. Computer 110 then repeats Block 730 and 735 for the newly selected object. Once all of the detected objects have been selected, computer 110 may adjust the predicted behavior of one or more of the detected objects (Block 745).

An adjustment in predicted behavior may be required due to the likely behavior of other detected objects. For example, in FIG. 5, autonomous vehicle 101 does not predict a lane change by vehicle 510 until after it has predicted that vehicle 520 is making a left-hand turn. In addition, the lane change by vehicle 510 will be made more likely, given that vehicle 520 will need to wait for vehicles 540 and 550 to pass before making it's turn. The predicted behavior of vehicle 510 is therefore interrelated to the predicted behavior of other nearby vehicles and must be adjusted accordingly. Based on the predicted behavior of the detected objects, computer 110 may implement a new or altered control strategy, such as by keeping a greater distance from vehicles that are expected to change lanes or change speeds in reaction to nearby vehicles (Block 750). As the autonomous vehicle travels along the desired route and remains under the control of the autonomous navigation system, computer 110 will repeat Block 715 through 750 for all objects detected along the route (Block 755). By implementing aspects of flow diagram 700, vehicle 101 will be able to autonomously react to surrounding vehicles or pedestrians in a way that minimizes the risk of accidents or other unwanted events.

Vehicle 101 may include one or more user input devices that enable a user to provide information to the autonomous driving computer 110. For example, a user, such as passenger 290, may input a destination (e.g., 123 Oak Street) into the navigation system using touch screen 217 or button inputs 219. In another example, a user may input a destination by identifying the destination. In that regard, the computer system may extract the destination from a user's spoken command (e.g., by stating or inputting "De young museum" as in the example of FIGS. 2 and 3).

The vehicle may also have various user input devices for activating or deactivating one or more autonomous driving modes. In some examples, the driver may take control of the vehicle from the computer system by turning the steering wheel, pressing the acceleration or deceleration pedals. The vehicle may further include a large emergency button that discontinues all or nearly all of the computer's decision-making control relating to the car's velocity or direction. In another example, the vehicle's shift knob may be used to activate, adjust, or deactivate these autonomous modes.

Computer 110 may include, or be capable of receiving information from, one or more touch sensitive input apparatuses 140. For example, computer 110 may receive input from a user input apparatus and use this information to determine whether a passenger is in contact with, such as by holding or bumping, a particular portion of vehicle 110. The touch sensitive input apparatuses may be any touch sensitive input device capable of identifying a force, for example a force resistance tape may be calibrated to accept or identify a threshold pressure input (such as 10 grams of pressure) or a range of pressures (such as 5-20 grams of pressure).

Again, these inputs may be understood by the computer as commands by the user to, for example, enter into or exit from one or more autonomous driving modes. For example, if the vehicle is being operated in an autonomous mode and the driver bumps the steering wheel, if the force is above the threshold input, the vehicle may go from an autonomous mode to a semi-autonomous mode where the driver has control of at least the steering.

The various systems described above may be used by the computer to operate the vehicle and maneuver from one location to another. For example, a user may enter destination information into the navigation, either manually or audibly. The vehicle may determine its location to a few inches based on a combination of the GPS receiver data, the sensor data, as well as the detailed map information. In response, the navigation system may generate a route between the present location of the vehicle and the destination.

When the driver is ready to relinquish some level of control to the autonomous driving computer, the user may arm the computer. The computer may be armed, for example, by pressing a button or by manipulating a lever such as gear shifter 220. Rather than taking control immediately, the computer may scan the surroundings and determine whether there are any obstacles or objects in the immediate vicinity which may prohibit or reduce the ability of the vehicle to avoid a collision. In this regard, the computer may require that the driver continue controlling the vehicle manually or with some level of control (such as the steering or acceleration) before entering into a fully autonomous mode.

Once the vehicle is able to maneuver safely without the assistance of the driver, the vehicle may become fully autonomous and continue to the destination. It will be understood that the driver may continue to assist the vehicle by controlling, for example, steering or whether the vehicle changes lanes, or the driver may take control of the vehicle immediately in the event of an emergency.

The vehicle may continuously use the sensor data to identify objects, such as traffic signals, people, other vehicles, and other objects, in order to maneuver the vehicle to the destination and reduce the likelihood of a collision. The vehicle may use the map data to determine where traffic signals or other objects should appear and take actions, for example, by signaling turns or changing lanes.

Once the vehicle has arrived at the destination, the vehicle may provide audible or visual cues to the driver. For example, by displaying "You have arrived" on one or more of the electronic displays.

In one aspect, the features described above may be used in combination with larger vehicles such as trucks, tractor trailers, or passenger busses. For such vehicles, the system may consider additional information when computing how to control the vehicle safely. For example, the physical attributes of a tractor trailer, such as its articulation and changing weight, may cause it to maneuver very differently than smaller passenger cars. Larger vehicles may require wider turns or different levels of acceleration and braking in order to avoid collisions and maneuver safely. The computer may consider the geometry of the vehicle when calculating and executing maneuvers such as lane changes or evasive actions.

The vehicle may be only partially autonomous. For example, the driver may select to control one or more of the following: steering, acceleration, braking, and emergency braking.

The vehicle may also address driver impairment. For example, if a driver has been unresponsive, has reduced cognitive abilities, or has been detected as having fallen asleep, the vehicle may attempt to wake or otherwise prompt the driver to respond. By way of example only, a camera capturing the driver's face may be used to determine whether the driver's eyes have remained closed for an extended period of time. If the driver remains unresponsive, the computer may cause the vehicle slow, stop or pull over to a safe location, or may assume control over the vehicle's direction or speed to avoid a collision.

In another example, the system may be always on with the driver primarily in control of the vehicle, but only intervene and take action when the vehicle detects that there is an emergency situation. For example, if a thick fog reduces the visibility of the driver, the vehicle may use its sensors to detect the presence of objects in the vehicle's path. If the vehicle determines that a collision is imminent yet the driver has taken no action to avoid the collision, the vehicle may provide the driver with a warning and, absent further correction by the driver, take one or more evasive actions such as slowing, stopping or turning the vehicle.

The vehicle may also improve driver performance while the vehicle is under the control of a driver. For example, if a driver fails to maintain the vehicle's position within a lane without using a turn signal, the vehicle may slightly adjust the steering in order to smooth out the vehicle's movements and maintain the vehicle's position within the lane. Thus, the vehicle may mitigate the likelihood of undesirable swerving and erratic driving. In another embodiment, if a driver is on a course to change lanes but has not activated the turn signal, the vehicle may automatically activate the turn signal based on the detected course of the vehicle.

The vehicle may also be used to train and test drivers. For example, the vehicle may be used to instruct new drivers in the real world, but may control various aspects of the ride in order to protect the new driver, people external to the car, and external objects. In another example, new drivers may be required to control the vehicle safely for some period. The vehicle may then determine whether the user is a safe driver and thus determine whether the user is ready to be a licensed driver.

The vehicle may also park itself. For example, the map information may include data describing the location of parking spots along a roadway or in a parking lot. The computer may also be configured to use its sensors to determine potential parking spots, such as causing the vehicle to travel down a road and checking for painted lines along a street that indicate an open parking space. If computer determines another vehicle or object is not within the spot, the computer may maneuver the vehicle into the parking spot by controlling the steering and speed of the vehicle. Using the method described above, the vehicle may also classify any objects that are near the potential parking spot, and position the vehicle within the parking spot based on those surrounding objects. For example, the vehicle may position itself closer to an adjacent bicycle than it would an adjacent truck.

The vehicle may also have one or more user interfaces that allow the driver to reflect the driver's driving a style. For example, the vehicle may include a dial which controls the level of risk or aggressiveness with which a driver would like the computer to use when controlling the vehicle. For example, a more aggressive driver may want to change lanes more often to pass cars, drive in the left lane on a highway, maneuver the vehicle closer to the surrounding vehicles, and drive faster than less aggressive drivers. A less aggressive driver may prefer for the vehicle to take more conservative actions, such as somewhat at or below the speed limit, avoiding congested highways, or avoiding populated areas in order to increase the level of safety. By manipulating the dial, the thresholds used by the computer to calculate whether to pass another car, drive closer to other vehicles, increase speed and the like may change. In other words, changing the dial may affect a number of different settings used by the computer during its decision making processes. A driver may also be permitted, via the user interface 225, to change individual settings that relate to the driver's preferences. In one embodiment, insurance rates for the driver or vehicle may be based on the style of the driving selected by the driver.

Aggressiveness settings may also be modified to reflect the type of vehicle and its passengers and cargo. For example, if an autonomous truck is transporting dangerous cargo (e.g., chemicals or flammable liquids), its aggressiveness settings may be less aggressive than a car carrying a single driver-even if the aggressive dials of both such a truck and car are set to "high." Moreover, trucks traveling across long distances over narrow, unpaved, rugged or icy terrain or vehicles may be placed in a more conservative mode in order reduce the likelihood of a collision or other incident.

In another example, the vehicle may include sport and non-sport modes which the user may select or deselect in order to change the aggressiveness of the ride. By way of example, while in "sport mode", the vehicle may navigate through turns at the maximum speed that is safe, whereas in "non-sport mode", the vehicle may navigate through turns at the maximum speed which results in g-forces that are relatively imperceptible by the passengers in the car.

The vehicle's characteristics may also be adjusted based on whether the driver or the computer is in control of the vehicle. For example, when a person is driving manually the suspension may be made fairly stiff so that the person may "feel" the road and thus drive more responsively or comfortably, while, when the computer is driving, the suspension may be made such softer so as to save energy and make for a more comfortable ride for passengers.

The vehicle may include a sleeping mode that allows the driver to give full control of the vehicle to the computer so that the driver may sleep or reduce his or her focus on the roadway. For example, the vehicle may include a user input device that allows the user to input information such as the duration of the sleep mode, e.g., 20 minutes, 4 hours, 8 hours, etc. In response, the vehicle may drive slower or on less traveled roadways, select a route that will get the driver to the destination in the identified period, or select a route which that avoid bumps or other disturbances to the driver.

Figure 8:
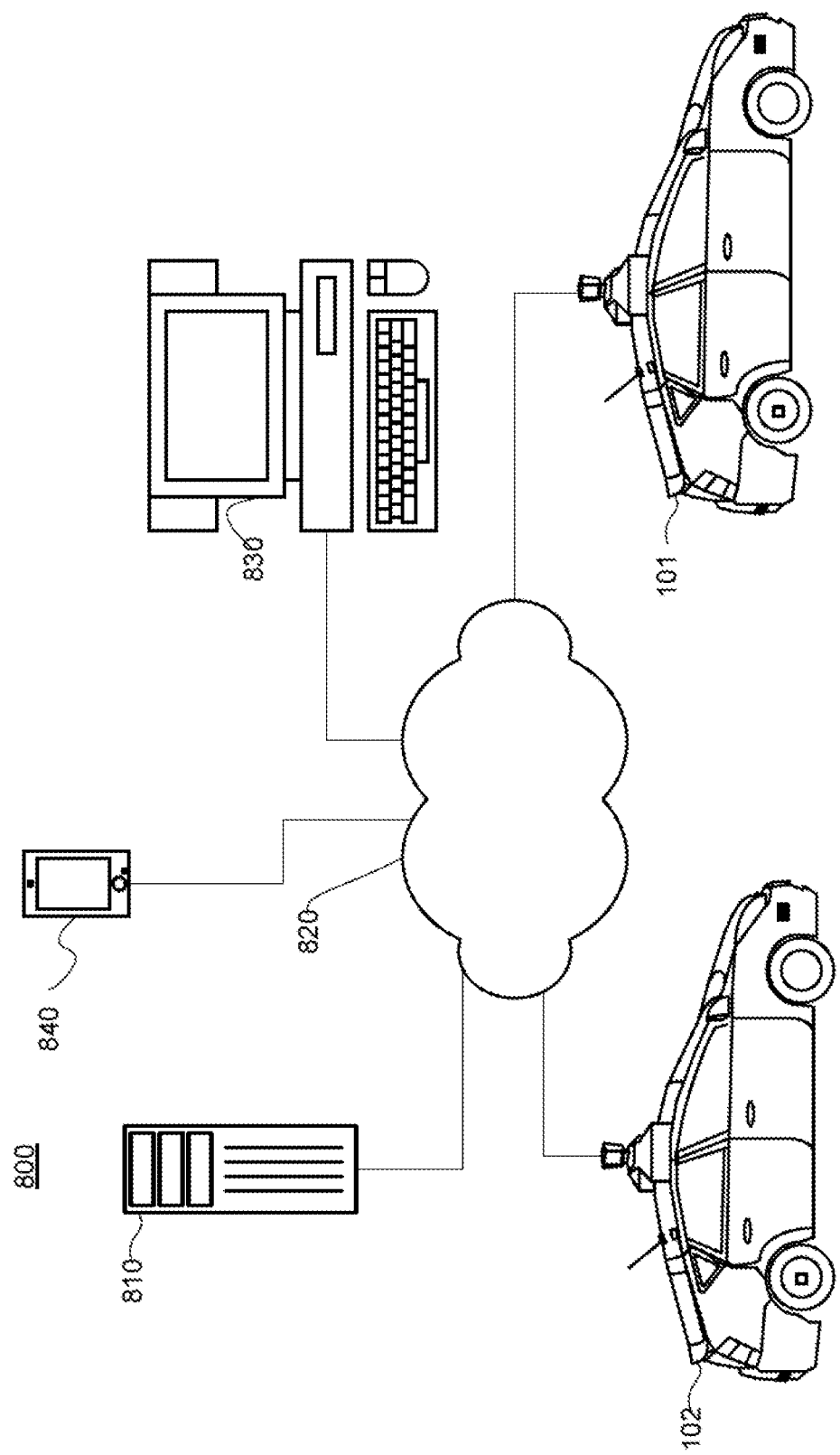
FIG. 8 is a functional diagram of a communication system in accordance with an aspect of the disclosure.

The driver may also select to have his or her vehicle communicate with other devices. As shown in FIG. 8, vehicle 101 may communicate over a network 820 with devices such as a remote server 810, a personal computer 730, a mobile device 740, or another autonomous vehicle 802. In addition, vehicles, such as vehicle 101 and vehicle 102, may wirelessly transmit information directly to nearby vehicles using radio, cellular, optical or other wireless signals. Alternatively, vehicles may communicate with each via nodes that are shared among multiple vehicles, e.g., by using cell towers to call other cars or transmit and send information to other cars via the Internet. The transmitted information between vehicles may include, for example, data describing the vehicle or the vehicle's environment.

In one example, a driver of a first vehicle may select an option to allow other vehicles on the roadway to transmit information from the vehicle's sensors or computer. This information may include details about the first vehicle's environment such as detected objects, traffic conditions, or construction. The information transmitted to other vehicles may be sensor data unprocessed by the first computer or information previously processed by the first computer in order to reduce the time needed to obtain and process the information at a second vehicle. If the second autonomous vehicle is behind the first vehicle, it may use the information to determine how to maneuver the vehicle. By way of example, if the first vehicle is only a few car lengths in front of the second vehicle and it detects a moving object, the first vehicle may transmit information relating to the moving object to the second vehicle. If the second vehicle determines that the object is moving towards the second vehicle's path, the second vehicle may slow down. Yet further, if the second vehicle is a few miles behind the first vehicle and the first vehicle determines that it is in a traffic jam (e.g., by determining that its speed is substantially less than the road's speed limit), the second vehicle may select an alternate route.

In addition to cooperatively driving together in lines, autonomous vehicles may also communicate in order to increase convenience and safety on the roadways. For example, autonomous vehicles may be able to double (two vehicles in a row) and triple park (three vehicles in a row) next to other autonomous vehicles. When a driver would like to use a vehicle which is parked in or surrounded by other autonomous vehicles, the driver's vehicle may send a signal instruction the other vehicles to move out of the way. The vehicles may respond by cooperatively maneuvering to another location in order to allow the driver's vehicle to exit and may return to park again.

In another example, the cooperation mode may be used to promote smarter road crossings. For example, if several autonomous vehicles are approaching and intersection, the right-of-way problem, or which vehicle should be next to enter the intersection, may be calculated and determined cooperatively among the several vehicles. In another example, traffic signals may change quickly, such as within only a few seconds or less, to allow more vehicles to pass through an intersection in multiple directions. The vehicle may only need the traffic signal to be green for a second or less in order to pass through the intersection at high speeds.

Vehicle 101 may also receive updated map or object data via network 820. For example, server 810 may provide vehicle 101 with new data relating to object classifications and behavior model information. Computer system 110, of FIG. 1, may then be updated, and the new data may be used in controlling the vehicle autonomously, such as through implementation of flow diagram 700.

As these number and usage of these autonomous vehicles increases, various sensors and features may be incorporated into the environment to increase the perception of the vehicle. For example, low-cost beacon transmitters may be placed on road signs, traffic signals, roads or other highway infrastructure components in order to improve the computer's ability to recognize these objects, their meaning, and state. Similarly, these features may also be used to provide additional information to the vehicle and driver such as, whether the driver is approaching a school or construction zone. In another example, magnets, RFID tags or other such items may be placed in the roadway to delineate the location of lanes, to identify the ground speed vehicle, or increase the accuracy of the computer's location determination of the vehicle.

Autonomous vehicles may also be controlled remotely. For example, if the driver is asleep, the sensor data may be sent to a third party so that vehicle may continue to have a responsive operator. While delay and latency may make this type of telemetry driving difficult, it may for example be used in emergency situations or where the vehicle has gotten itself stuck. The vehicle may send data and images to a central office and allow a third party to remotely drive the vehicle for a short period until the emergency has passed or the vehicle is no longer stuck.

As these and other variations and combinations of the features discussed above can be utilized without departing from the invention as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A method of controlling a vehicle in an autonomous driving mode, the method comprising:
   receiving, by one or more processors of the vehicle, sensor data generated by one or more sensor devices mounted on the vehicle, the sensor data corresponding to a set of objects detected by the one or more sensor devices in an external environment of the vehicle;
   accessing, by the one or more processors, data containing a plurality of object classifications and behavior information;
   determining, by the one or more processors, a classification of each object in the set of objects detected by the one or more sensor devices based on the accessed data;
   for each object in the set of objects, predicting, by the one or more processors, at least one future action of the object based on:
      a likely behavior of the object according to the behavior information,
      a current trajectory of the object with respect to map information, and
      the classification of the object determined based on the accessed data; and
   controlling, by the one or more processors, the vehicle in the autonomous driving mode based on the predicted at least one future action of each object in the set of objects.

2. The method of claim 1, wherein the map information is contained in the accessed data.

3. The method of claim 1, further comprising:
   determining, by the one or more processors based on the sensor data, a type of each object in the set of objects based on one or more of a size of the object, heat emitted from the object, or a speed of the object.

4. The method of claim 3, wherein the type of at least one object in the set of objects is determined to be a vehicle based on information contained on a license plate or logos that appear on the object.

5. The method of claim 1, wherein the predicting the at least one future action of each object in the set of objects further comprises predicting that an object in the set of objects is a car in a turning lane at an intersection controlled by a traffic signal that will make an appropriate turn when the traffic signal indicates that it is proper to make the turn.

6. The method of claim 1, wherein the predicting the at least one future action of each object in the set of objects is further based on environmental data that was obtained at a previous point in time, and the map information includes the environmental data.

7. The method of claim 6, wherein the map information includes explicit speed limit information associated with different roadway segments.

8. The method of claim 6, wherein the map information identifies at least one of roadways, lanes, intersections, crosswalks, or traffic signals.

9. The method of claim 1, wherein the predicting the at least one future action of each object in the set of objects is further based on object data containing numerous object classifications and behavior information that indicates how an object having a particular classification is likely to behave in a given situation.

10. The method of claim 1, further comprising, tracking a current state of one or more objects in the set of objects, wherein the current state includes at least one of speed, route, lane changes or use of headlights or blinkers.

11. A system for controlling a vehicle in an autonomous driving mode, the system comprising:
    one or more sensor devices mounted on the vehicle; and
    one or more processors configured to:
       receive sensor data generated by the one or more sensor devices, the sensor data corresponding to a set of objects detected by the one or more sensor devices in an external environment of the vehicle;
       access data containing a plurality of object classifications and behavior information;
       determine a classification of each object in the set of objects detected by the one or more sensor devices based on the accessed data;
       for each object in the set of objects, predict at least one future action of the object based on:
          a likely behavior of the object according to the behavior information,
          a current trajectory of the object with respect to map information, and
          the classification of the object determined based on the accessed data; and
       control the vehicle in the autonomous driving mode based on the predicted at least one future action of each object in the set of objects.

12. The method of claim 1, further comprising adjusting the predicted at least one future action of each object in the set of objects based on the predicted at least one future action of one or more other objects in the set of objects.

13. The system of claim 11, wherein the one or more processors are further configured to determine, based on the sensor data, a type of each object in the set of objects based on one or more of a size of the object, heat emitted from the object, or a speed of the object.

14. The system of claim 13, wherein the type of at least one of the objects in the set of objects is determined to be a vehicle based on information contained on a license plate or logos that appear on the object.

15. The system of claim 11, wherein the one or more processors are further configured to predict that an object in the set of objects is a car in a turning lane at an intersection controlled by a traffic signal that will make an appropriate turn when the traffic signal indicates that it is proper to make the turn.

16. The system of claim 15, wherein the one or more processors are further configured to predict the at least one future action of each object in the set of objects based on environmental data that was obtained at a previous point in time, and the map information includes the environmental data.

17. The system of claim 16, wherein the map information includes explicit speed limit information associated with different roadway segments.

18. The system of claim 16, wherein the map information identifies at least one of roadways, lanes, intersections, crosswalks, or traffic signals.

19. The system of claim 11, wherein the one or more processors are further configured to predict the at least one future action of each object in the set of objects based on object data containing numerous object classifications and behavior information that indicates how an object having a particular classification is likely to behave in a given situation.

20. The system of claim 11, wherein the one or more processors are further configured to track a current state of one or more objects in the set of objects, wherein the current state includes at least one of speed, route, lane changes or use of headlights or blinkers.

21. The system of claim 11, further comprising the vehicle.

22. The system of claim 11, wherein the one or more processors are further configured to adjust the predicted at least one future action of each object in the set of objects based on the predicted at least one future action of one or more other objects in the set of objects.

23. The system of claim 11, wherein the map information is contained in the accessed data.

* * * * *